T. S. Steadman.
Clover Harvester.
No. 2009 Reissued Jun. 20, 1865.
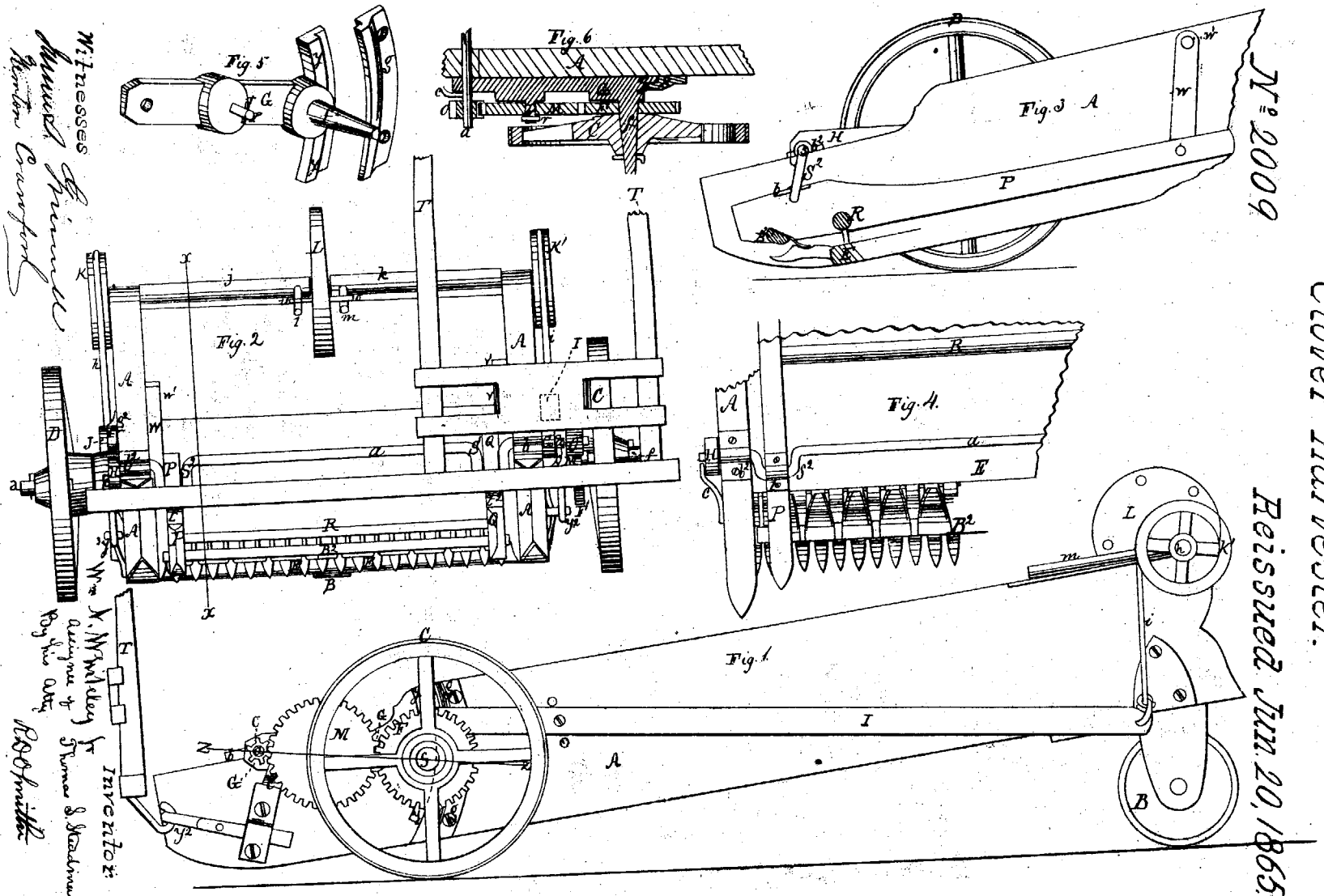
Witnesses
Samuel Grimell
Newton Crawford
Inventor
Wm. N. Wheeley for
Assignee of
Thomas S. Steadman
By his Atty
R. D. Smith

UNITED STATES PATENT OFFICE.

WM. N. WHITELEY, JR., OF SPRINGFIELD, OHIO, ASSIGNEE OF THOMAS S. STEADMAN, OF MURRAY, NEW YORK.

IMPROVEMENT IN CLOVER AND GRASS SEED HARVESTERS.

Specification forming part of Letters Patent No. 10,967, dated May 23, 1854; Reissue No. 987, dated June 19, 1860; Reissue No. 2,009, dated June 20, 1865.

*To all whom it may concern:*

Be it known that THOS. S. STEADMAN, of Murray, in the county of Orleans and State of New York, did invent new and useful Improvements in Clover and Grass Seed Harvesters; and I do hereby declare the following to be a full, clear, and exact description of the construction and operation of the same, as included in this patent, reference being had to the accompanying drawings, making a part of this specification, in which—

Figure 1 is a side elevation of the machine. Fig. 2 is a front elevation of the same; Fig. 3, a vertical longitudinal section of the machine on the line *x x*, Fig. 2, showing the construction and operation of the cutters and rake. Fig. 4 is a plan view of a part of the front end of the machine, showing the construction and operation of the cutters, fingers, &c. Fig. 5 is a perspective view of the supplemental frame, with the axles of the intermediate wheel and main driving-wheel, the guiding-arc, and the retaining-arc detached; and Fig. 6 is a horizontal section of the supplemental frame, gearing and driving wheel on the line *z z*, Fig. 1.

The nature of that part of the invention embraced in this application will be best understood by reference to the following description and explanation.

Those ends of the cutting apparatus and other parts which are nearest to the cutters' driving-wheel I call the "inner" ends, and those ends which are farthest from said driving-wheel I call the "outer" ends.

The same letter denotes the same part of the machine wherever it occurs in the drawings.

A is the main frame of the machine, and is ten feet long, five feet wide, and one and a half foot deep, more or less. Near the rear end, and under the frame, is the caster-wheel B (about one and a half foot in diameter) for the purpose of enabling the machine to be turned freely. Near the front end are the wheels C and D, (of about three feet diameter,) which carry this end of the machine when the guard-finger bar E is not resting upon the ground. (See Figs. 1 and 3.) One of these carrying-wheels, C, is also the cutters' driving-wheel, and therefore has the cog-wheel F attached to it for the purpose of transmitting its motion to the cutters.

*f* is the axle upon which the bearing-wheel C and the cog-wheel F revolve, and is formed on or rigidly secured to the coupling-arm or supplementary frame G near its rear end. The coupling-arm or supplementary frame G is a plate of suitable length, having at one end a circular hole, through which is passed the end of the pinion-shaft *a*, and at the other end the rabbeted curved cross-head *y*, Fig. 5, and is provided on its outer side with hubs for the axles *f* of the bearing-wheel C, and *p* of the intermediate gear-wheel, M. The shaft *a* is provided with two cranks, and extends entirely across the main frame of the machine, and projects beyond the outer surfaces of said frame far enough to accommodate the coupling-arm G and the pinion O upon the inner projected end. It is secured to the upper edges of the frame A by the boxes *b* and $b^2$, and the coupling-arm is maintained in its proper place on the shaft *a* by the holding-plate *c*, which is so constructed and connected with the shaft *a* as to permit this coupling-arm to be slipped on or off when turned into the proper position, and the pinion O to be put on after it. By having the axle *f* thus connected to the pinion-shaft *a* by the coupling-arm G the axial lines of the axle *f* and shaft *a* must always remain at the same distance asunder, whatever may be their vertical position in respect to each other. The pinion O is attached to the pinion-shaft *a*, and the cog-wheel F is attached to the driving-wheel C. The wheel F and pinion O are connected by the intermediate cog-wheel, M, which is inserted by giving the cutters a backward motion as they pass over the fingers. The wheel M is removed from its place when it is designed to throw the cutters out of gear.

To keep the cutters' driving cog-wheel and its pinion O in perfect connection, at whatever height the cutters be, in respect to the axle of their driving cog-wheel is of great value in any harvester, as none can work well unless these gears be kept in perfect connection at all times; but the attachment of the axles of these gears to one piece, so that it is certain they will always remain in perfect connection, is of the greatest advantage in that class of harvesters which allow the constant change of vertical position in respect to each other between the frame to which the cutting apparatus is secured and the axle of the cutters' driving cog-wheel, caused by the undulations of the ground over which the machine is drawn.

In order to preserve the coupling-arm G in the proper position—that is, to maintain the axle *f*, parallel with the pinion-shaft *a*, about at right angles to the side of the main frame A—the rabbeted curved plate *g*, Figs. 1, 5, and 6, whose concave curve corresponds to the convex curve of the cross-head *y*, (and whose rabbet is internal, or on the under side, while the cross-head rabbet is on the outer side,) is secured by bolts or screws to the side of the frame A in such a way that the rabbeted surfaces overlap each other without interfering with the free vertical motion of the coupling-arm G, in obedience to the undulations of the ground over which the machine is passing. The parallelism of the axle *f* and the shaft *a* is thus always preserved without regard to their relative vertical position.

Upon the outer side of the machine the bearing-wheel D is attached to coupling-arm H, which is similar to the arm G, except that it has no provision for an intermediate or other gear-wheel. It is hung upon the projected end of the shaft *a*, in the same manner shown as to G, and is provided with a similar rabbeted cross-head and guiding-arcs, though these special arrangements are not necessary, as there is no connected gearing to be affected by a change of distance between the center of the axle of the bearing-wheel D and the center of the shaft *a*. The parallelism of the axle D, the shaft *a*, the cutting apparatus, and the axle *f* is, however, perfectly preserved, however much the vertical positions of those several parts may be varied in respect to each other.

It will appear obvious from the foregoing description that either end of the cutting apparatus may be raised or lowered independent of the other end.

I and J are the levers by means of which the attendant of the machine, whether riding on it or not, raises the cutting apparatus from the ground, on which it runs when not supported by these levers. They are pivoted to the frame A near their forward ends, and extend from the hubs at the bases of the axles *f* and *d* backward nearly or quite to the rear end of the machine. The forward ends of the levers I and J rest upon the hubs at the rear ends of the coupling-arms G and H, and to their rear ends are attached the cords *h* and *i*, which pass thence upward and around the pulleys K and K′ on the outer ends of the windlass-shafts *j* and *k*, which are operated by the hand-levers *l* and *m*. The two shafts *j* and *k* have their inner bearings in the plate L, and they are maintained in any desired position by putting the pins *n o* into proper holes through the plate L, so that the hand-levers *l* and *m* will strike against and be stopped by the said pins.

That the attendant of the machine will be enabled, whether riding on it or not, to raise or lower either end of the cutting apparatus without so moving the other will be obvious from the fact of their being two separate and distinct raising and lowering devices, one for each end of the cutting apparatus; and it will also be obvious that he can raise one end of the cutting apparatus while he lowers the other, or he can raise or lower both ends simultaneously; and it will further be observed that the wheels C and D always keep to the ground, though the cutting apparatus, or either end of it, may be raised much higher, in passing over a stone or stump, than held by the levers I and J, or either of them.

To the bar E, forming the front of the frame or box A, is secured the teeth or guard-fingers, twenty in number, more or less, according to the width of the machine. These teeth or fingers are about sixteen inches long, one and a half inch broad at their rear ends, and brought to a point, or nearly, so at their front ends. They are made of common spring-steel three-sixteenths of an inch in thickness, and have a concave surface near their rear ends, somewhat agreeing with the curve described by the cutters or knives in moving over them, while their points are bent outward, for enabling them to take up grass or clover which is "laid."

S and $S^2$ are the cranks which drive the cutters and the automatic rake, and are formed by properly bending the pinion-shaft *a*. They are six or eight inches long, and have attached to them, by the boxes *t* and $t^2$, the wooden bars P and Q, which are four or five feet in length, and have a bar, $B^2$, of wood or iron, attached to their under edges, and near their front ends, to which bar the cutters are attached. The rear ends of the bars P and Q are connected with the lower ends of the vibrating arms *w* and *v*, whose upper ends are pivoted to the upper edges of the main frame A at *w′* and *v′*. The cutters are six or seven inches long, two inches wide where attached to the cutter-bar, and tapered toward the point until one-fourth of an inch wide, and so placed in respect to the fingers that the points, when cutting the crop, will be about over the center of each alternate finger, and thereby prevented from being bent downward or broken. The cutters are beveled from the upper side, and are concave on the upper side to correspond with the arc of the curve described by them during each revolution of the pinion-shaft *a*. By having the teeth or fingers and cutters thus arranged in respect to each other, each edge of each cutter receives so much of the crop as stands between two of the fingers.

R is the automatic rake, sixteen or eighteen inches in rear of the cutters and connected to the wooden bars P and Q, and has teeth projecting below it for removing at each of its vibrations that part of the crop cut at the last preceding vibration of the cutters. The cutters, by having imparted to them an elliptical movement that carries them upward and downward, as well as forward and backward, reach forward over the crop before cutting it, and by the act of cutting give it a backward movement toward the automatic rake, which, by having its motion more directly backward and forward than the motion of the cutters, removes the cut crop backward as fast as cut, except that it makes one revolution before any of the crop is brought within its reach. The cutters and automatic rake have about six backward and forward vibrations to one revolution of their driving-wheel C—a relative speed which has been found to work well; but it will be obvious that this number of vibrations may be increased or diminished at the pleasure of the constructer of the machine.

The animal which draws the machine is hitched between the thills T and walks on the stubble in front of the cutters' driving-wheel C, near the standing crop. These thills T are attached to the frame or box A, at $y^2$ and $y^3$, by hinge-joints, which will allow the front of the frame, to which the cutting apparatus is secured, to be raised or lowered in respect to the height of the cutters' driving-wheel, while the front end of the thills or tongue remains at the same height.

The aforesaid inventor having shown one good way of applying his improvements to use, it will appear obvious that they may be applied to other harvesters not in all respects like this without departing from the principles or spirit of his invention.

What I claim under this patent as the invention of THOMAS S. STEADMAN, and desire to secure by Letters Patent, is—

1. The combination of the holding-plate *c*, or its equivalent, with the shaft of the driving cog-wheel's pinion and that end of the coupling-arm or supplementary frame G, or its equivalent, which is hung and vibrated on said shaft.

2. The combination or arrangement of the following elements in a harvester, viz: a frame or box having the cutting apparatus connected to and drawn forward by it, the shaft of the main driving cog-wheel's pinion, also connected to it, and about at right angles to its forward movement, a coupling-arm or supplementary frame, or its equivalent, having one end hung and vibrated on said pinion-shaft, and near the other end connected to the axle of the main driving cog-wheel, and a holding device, whereby the attendant can have the inner end of the cutting apparatus held at different heights in respect to the axle of the main driving cog-wheel.

3. Connecting the main bearing and driving wheel of a harvester with the frame to which the cutting appartus is attached in such a manner that the attendant can, while riding on the machine, vary the height of the inner end of the cutting apparatus, while the outer end of said apparatus remains unchanged, substantially as described.

4. The combination of the retaining and guiding arc $g^2$, or its equivalent, with the axle end of the coupling-arm or supplementary frame H, or its equivalent, the outer end of a harvester's cutting apparatus, and the wheel that carries this outer end or is nearest to it.

5. The combination of the axles *f* and *d*, the wheels C and D, the projecting ends of the shaft of the main driving cog-wheel's pinion, the frame or box carrying this shaft, the coupling-arms or supplementary frames G and H, the holding-plates *c c*, and the retaining and guiding arcs *g* and $g^2$, or their equivalents.

6. The combination or arrangement of the following parts or elements in a harvester: a frame or box which carries the shaft of the cutters' main driving cog-wheel's pinion, a coupling-arm or supplementary frame having the axle of the said cog-wheel connected to it at or near its outer end, and the inner end hung upon said pinion-shaft, a holding device by which it is properly held in that place, a guiding and retaining arc attached to the main frame of the machine, and maintaining the supplementary frame or coupling-arm in place, cutters driven by a crank motion, and an automatic rake, which, as well as the cutters, receives its motion through the main driving cog-wheel's pinion-shaft.

7. Connecting the axle of the cutters' first driving cog-wheel and said wheel's pinion-shaft by the coupling-arm or supplementary frame G, or an equivalent thereof, which has one end hung on said pinion-shaft, and therefore holds the said cog-wheel's axle always at the same distance therefrom, so that the connection of the said cog-wheel and its pinion will always remain the same.

8. The combination of the retaining and guiding arc *g* or its equivalent, with the main frame or box of a harvester, to which the cutting apparatus is secured, and the axle end of the coupling-arm or supplementary frame G, or its equivalent, which has the other end hung on the pinion-shaft connected to the main frame, about parallel with the axle of the cutters' ground and driving wheel, so that the said axle and pinion-shaft are always at the same distance apart and substantially parallel, and the axle end of said coupling-arm free to rise and fall, vibrating on said pinion-shaft while the machine is in motion.

In witness whereof I have hereunto set my hand.

WM. N. WHITELEY, JR.

Witnesses:
GEO. ARTHUR,
GEO. W. BENNS.